United States Patent [19]

Omura

[11] Patent Number: 5,958,571
[45] Date of Patent: Sep. 28, 1999

[54] MATERIAL FOR A GASKET COATED WITH FOAM RUBBER

[75] Inventor: Atsushi Omura, Nara, Japan

[73] Assignee: Nichias Corporation, Tokyo, Japan

[21] Appl. No.: 09/049,665

[22] Filed: Mar. 27, 1998

[30] Foreign Application Priority Data

Mar. 28, 1997 [JP] Japan ................................. 9-095223

[51] Int. Cl.⁶ ............................... B32B 3/26; B32B 5/32; B29C 67/20
[52] U.S. Cl. ................... 428/316.6; 264/45.3; 264/48; 264/343; 277/654; 277/938; 277/939; 277/944; 428/317.9; 428/319.1; 521/918
[58] Field of Search .................... 277/654, 936, 277/938, 939, 944; 428/316.6, 317.9, 319.1; 264/45.3, 48, 343; 521/918

[56] References Cited

U.S. PATENT DOCUMENTS 5,615,897  4/1997  Akita ........................................ 277/654

OTHER PUBLICATIONS

English Abstract of JP 63–264691, Nov. 1988.

English Abstract of JP 01–116381, May 1989.

English Abstract of JP 08–93920, Apr. 1996.

*Primary Examiner*—Blaine Copenheaver
*Attorney, Agent, or Firm*—Flynn, Thiel, Boutell & Tanis, P.C.

[57] ABSTRACT

In order to improve the sealing property and the resistance to pressure of a gasket coated with foam rubber layers, the foam rubber layers are formed on both surfaces of a metal plate from a rubber which is swollen by the medium to be sealed by the gasket, e.g. a rubber having an oil swelling property such as an NBR, is used. In this way the sealing property thereof is improved.

11 Claims, 2 Drawing Sheets

MATERIAL FOR A GASKET COATED WITH FOAM RUBBER

FIELD OF THE INVENTION

The present invention relates to a material for a gasket coated with foam rubber, in which foam rubber layers are formed on both surfaces of a metal plate, and in particular to an improvement of a gasket so as to has a good sealing property in a wide temperature region owing to the fact that the sealing property after exposure to a high temperature atmosphere is improved.

DESCRIPTION OF THE PRIOR ART

Heretofore there are known gaskets coated with rubber, in each of which rubber layers are formed on both surfaces of a metal plate, non asbestos type gaskets, etc. However, since this kind of prior art gaskets have small amounts of compression and resiliency of the rubber layers, it was necessary to subject them to a special working such as embossing, etc. in order to deal with deformation of a flange or an abnormal gap between flanges, on which they are mounted.

Therefore, gaskets coated with foam rubber, in each of which foam rubber layers are formed on both surfaces of a metal plate, have been used. These gaskets have great amounts of compression and resiliency of the foam rubber layers in a temperature region around room temperature and therefore it is possible to obtain a good sealing property by dealing with deformations of a flange or an abnormal gap between flanges, on which they are mounted, without any special working such as embossing, etc.

However, since materials for prior art gaskets coated with foam rubber had small amounts of resiliency and large permanent deformation of the foam rubber layers after exposure to a high temperature, they were unable to deal with displacements of flanges or an abnormal gap therebetween due to vibration or application of pressure so that they had a drawback that leaking of the sealed liquid was produced.

Further, since a high superficial pressure was applied thereto directly below screws by the fact that they were mounted on a flange by means of the screws, they had a drawback that a flow of the foam rubber was produced after exposure to a high temperature, which gave rise to torque-down or leakage of sealed liquid.

SUMMARY OF THE INVENTION

An object of the present invention is, therefore, to provide a material for a gasket coated with foam rubber, which is improved in resiliency (sealing property) and resistance to pressure of the foam rubber layers after exposure to a high temperature atmosphere.

In order to achieve the above object, a material for a gasket, in which foam rubber layers are formed on both surfaces of a metal plate, according to the present invention, is characterized in that the base rubber for the foam rubber layers is one having such a property that it is swollen by the medium which is to be sealed by the material.

In the material for a gasket coated with foam rubber according to the present invention, a rubber having a great oil swelling property may be used as the base rubber for the foam rubber layers.

In the material for a gasket coated with foam rubber according to the present invention, the base rubber for the foam rubber layers may be an NBR having a nitrile amount lower than 30% and a Mooney viscosity greater than 60.

In the materials for a gasket coated with foam rubber according to the above different inventions carbon having a low reinforcing property an inorganic filler may be blended in the base rubber.

Further, in the materials for a gasket coated with foam rubber according to the above invention, MT or FT carbon from 40 to 150 PHR (Parts Hundred Rubber) as the carbon and clay or calcium carbonate from 0 to 80 PHR as the inorganic filler, in total more than 60 PHR, may be blended therein.

DESCRIPTION OF THE PREFERRED EMBODIMENTS

As a mode of realization of the present invention, in order to improve the resiliency (sealing property) and resistance to pressure of the material for a gasket coated with foam rubber after exposure to a high temperature atmosphere, in which foam rubber layers are formed on both surfaces of a metal plate, rubber having the property that it is swollen by the medium to be sealed is used for the base rubber of the foam rubber layers. For the base rubber, e.g. in cases where the medium to be sealed is oil, NBR or SBR having a low nitrile amount, a rubber having a great oil swelling property such as natural rubber, etc., or a rubber obtained by blending them can be used. For this NBR, it is suitable to use a nitrile amount below 30% and a Mooney viscosity greater than 60.

Elasticity and hardness of the foam rubber layers can be increased so that their buckling characteristics are improved by blending a carbon having a low reinforcing property, e.g. MT (medium thermal furnace black) or FT (fine thermal furnace black) carbon from 40 to 150 PHR and clay or calcium carbonate from 0 to 80 PHR, in a total more than 60 PHR in the base rubber.

Hereinbelow, several preferred embodiments of the present invention will be explained.

Figure 1:
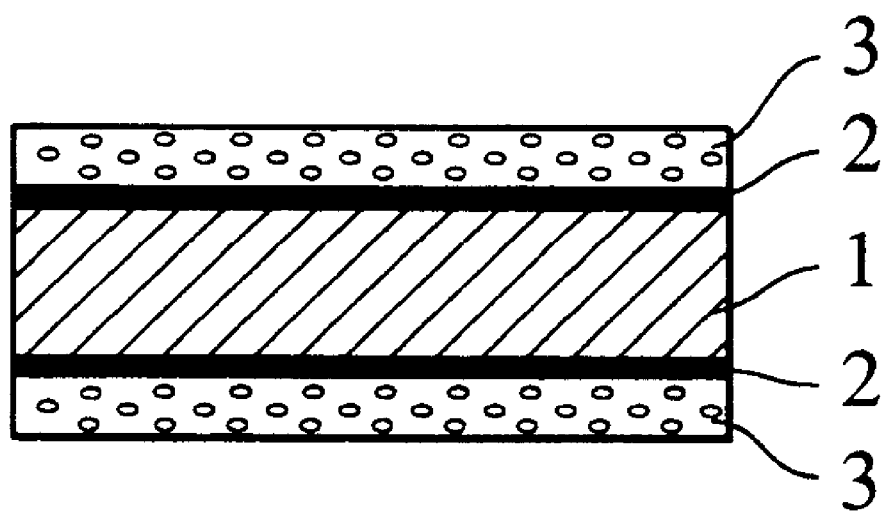
FIGS. 1 and 2 are schematical diagrams showing embodiments of the present invention.
Figure 2:
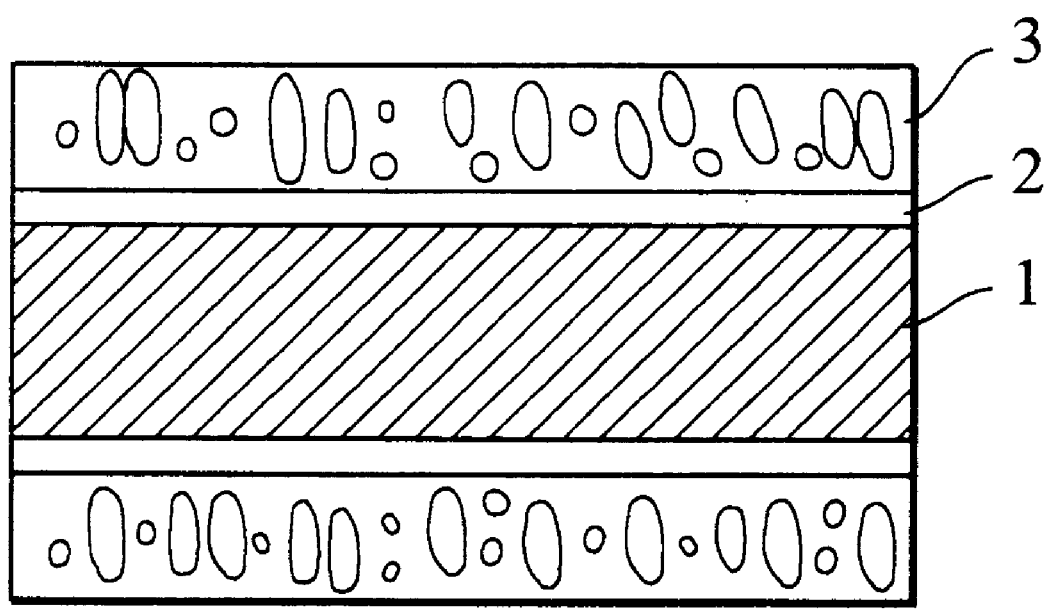

At first, as indicated in FIGS. 1 and 2, grease is removed from both surfaces of a metal base member 1 (0.15 to 0.8 mm thick, made of a cold pressed steel plate, aluminium, stainless steel, etc.) and they are roughened. After having subjected them to a phosphorating processing, primer 2, whose main component is a phenol resin, is applied thereto and dried.

A rubber compound obtained by blending MT carbon of 80 PHR, clay of 40 PHR, a deterioration preventing agent, a bridging agent, a thermal decomposition type foaming agent, etc. in an NBR having a nitrile amount of 18% and a Mooney viscosity of 72 is dissolved in a mixed solvent of toluene/n-propyl acetic acid, which is applied to both surfaces of the primer processed metal member 2 and dried so as to form rubber coating layers 3, each of which is 100 μm thick.

Further, a layer such as graphite can be applied to each of the rubber layers coating metal layer 3 and vulcanized at a temperature from 180 to 240° C. for a duration from 10 to 20 min. In this way the material for a gasket coated with foam rubber is obtained.

Materials for a gasket coated with foam rubber of EMBODIMENTS 2 and 3 and EXAMPLES FOR COMPARISON 1 to 4 as indicated in TABLE 1 were prepared by specifications similar to that used in EMBODIMENT 1, changing the rubber blend. Results obtained by measuring the resistance to pressure (application of 800 kgf/cm$^2$), resiliency (gap between flanges capable of holding a sealing pressure of 1 kgf/cm$^2$), and the swelling ratio of these materials in high temperature ATF oil are indicated in the same table.

TABLE 1

|  | EMBODIMENTS | | | EXAMPLES FOR COMPARISON | | | |
| --- | --- | --- | --- | --- | --- | --- | --- |
| NUMBER | 1 | 2 | 3 | 1 | 2 | 3 | 4 |
| KIND OF RUBBER | NBR | NBR | NBR/NR | NBR | NBR | NBR | NBR |
| NITRILE AMOUNT (%) | 18 | 25 | — | 34 | 18 | 18 | 34 |
| MOONEY VISCOSITY | 72 | 68 | — | 56 | 32 | 72 | 56 |
| KIND OF CARBON | MT | MT | FT | MT | MT | SRF | MT |
| (PHR AMOUNT) | 80 | 120 | 50 | 80 | 80 | 60 | 50 |
| KIND OF FILLER | CLAY | — | CALCIUM CARBONATE | CLAY | CLAY | CLAY | — |
| (PHR AMOUNT) | 40 | — | 50 | 40 | 40 | 40 | — |
| RESISTANCE TO PRESSURE | GOOD | GOOD | GOOD | GOOD | GOOD | GOOD | BAD |
| RESILIENCY ($\mu$m) | 40 | 35 | 40 | 5 | 5 | — | 20 |
| SWELLING RATIO (%) | +10.3 | +9.0 | +11.1 | ±0 | ±0 | — | +5.0 |
| REMARKS |  |  |  |  |  | HARDLY FOAMED |  |

As clearly seen from TABLE 1, it can be admitted that an effect of increasing the resiliency of the foam layers after exposure to a high temperature and improving the fitness to the flanges can be obtained by using a rubber having a property that it is swollen by the medium to be sealed as the base rubber for the foam rubber layers. It is clear that an effect of increasing the elasticity and hardness of the foam layers and an action of improving the resistance to heat can be obtained by blending carbon having a low reinforcing property an and inorganic filler therein, because the reinforcing property is low and blending of a large amount is possible.

As explained above, according to the present invention, an effect of improving the sealing property can be exhibited by improvement of resiliency of the foam layers and fitness to flanges after exposure to high temperature oil owing to increase in the amount of swelling by using a rubber having a property that it is swollen by medium to be sealed.

In addition, an effect of improving the resistance to pressure owing to increase in elasticity and hardness of the foam layers and an effect of improving the resistance to pressure at exposure to a high temperature atmosphere owing to an improvement of the resistance to pressure can be exhibited by blending carbon having a low reinforcing property and an inorganic filler therein.

What is claimed is:

1. In a gasket for sealing a liquid medium comprising a metal plate and foam rubber layers provided on opposite surfaces of the metal plate, the improvement comprising the foam rubber layers containing carbon having a low reinforcing property and an inorganic filler blended therein and being swollen by the liquid medium being sealed by the gasket.

2. A gasket according to claim 1, wherein said rubber has an oil swelling property.

3. A gasket according to claim 1, wherein the carbon is medium thermal furnace black or fine thermal furnace black carbon and is present in an amount of from 40 to 150 parts per hundred parts rubber and the inorganic filler is clay or calcium carbonate and is present in an amount of from 0 to 60 parts per hundred parts rubber, the total amount of carbon and inorganic filler being greater than 60 parts per hundred parts rubber.

4. A gasket according to claim 1, wherein the rubber is selected from the group consisting of natural rubber, butadiene-acrylonitrile copolymer rubber, styrene-butadiene copolymer rubber and blends thereof.

5. A gasket according to claim 1, wherein the rubber is a butadiene-acrylonitrile copolymer rubber having a nitrile content less than 30% and a Mooney viscosity greater than 60.

6. A gasket according to claim 1, wherein the foam rubber layers have a resiliency of at least 35 $\mu$m and a swelling ratio of at least 9%.

7. In a method of sealing a liquid medium with a gasket comprising a metal plate and foam rubber layers provided on opposite surfaces of the metal plate, the improvement comprising the steps of forming said foam rubber layers from a rubber which is swollen by the liquid medium and blending carbon having a low reinforcing property and an inorganic filler with the rubber.

8. The method of claim 7, wherein the liquid medium is oil and the rubber is selected from the group consisting of a styrene-butadiene copolymer rubber, a butadiene-acrylonitrile copolymer rubber, a natural rubber and blends thereof.

9. The method of claim 8, wherein the carbon is medium thermal furnace black or fine thermal furnace black carbon and is present in an amount of from 40 to 150 parts per hundred parts rubber and the inorganic filler is clay or calcium carbonate and is present in an amount of from 0 to 60 parts per hundred parts rubber, the total amount of carbon and inorganic filler being greater than 60 parts per hundred parts rubber.

10. The method of claim 9, wherein the foam rubber layers have a resiliency of at least 35 $\mu$m and a swelling ratio of at least 9%.

11. The method of claim 8, wherein the rubber is a butadiene-acrylonitrile copolymer rubber having a nitrile content less than 30% and a Mooney viscosity greater than 60.

* * * * *